(12) United States Patent
Ycas

(10) Patent No.: US 7,600,709 B2
(45) Date of Patent: Oct. 13, 2009

(54) TAPE TENSION SENSOR

(75) Inventor: John A. Ycas, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 371 days.

(21) Appl. No.: 11/784,513

(22) Filed: Apr. 5, 2007

(65) Prior Publication Data
US 2008/0247076 A1 Oct. 9, 2008

(51) Int. Cl.
G11B 15/46 (2006.01)
(52) U.S. Cl. .................... 242/334.6; 360/71; 360/77.12
(58) Field of Classification Search ................ 242/334, 242/334.2, 334.3, 334.4, 334.6; 360/71, 360/77.12, 250, 73.08, 73.14, 69
See application file for complete search history.

(56) References Cited

U.S. PATENT DOCUMENTS

| 5,032,936 | A | | 7/1991 | Fujioka et al. | |
| 5,481,417 | A | * | 1/1996 | Yokoyama et al. | 360/73.08 |
| 5,602,688 | A | * | 2/1997 | Yokoyama et al. | 360/69 |
| 6,305,629 | B1 | * | 10/2001 | Chliwnyj et al. | 242/334.3 |
| 7,016,138 | B2 | * | 3/2006 | Egan | 360/71 |
| 2007/0285844 | A1 | * | 12/2007 | Nayak et al. | 360/250 |

* cited by examiner

Primary Examiner—William A Rivera
(74) Attorney, Agent, or Firm—Roeder & Broder LLP; James P. Broder

(57) ABSTRACT

A tension sensor within a tape drive for measuring tension of a magnetic tape medium is provided. The tension sensor comprises a guide pin connected to a top plate for guiding the magnetic tape medium; at least two flexure structures connected to the top plate and a base such that the at least two flexure structures are in a parallel configuration; and at least one magnetic field density sensor associated with the guide pin for detecting lateral motion of the guide pin. In some embodiments, the guide pin is a tape guiding roller.

18 Claims, 5 Drawing Sheets

TAPE TENSION SENSOR

BACKGROUND OF THE INVENTION

Storage subsystems, such as magnetic tape libraries, are widely used for storing information in digital form. Tape storage subsystems typically include one or more tape drives for reading and writing data to removable tape cartridges.

Magnetic tape cartridges have been used to conveniently and efficiently store and handle magnetic recording media for tape drives. One type of tape cartridge consists of a substantially rectangular exterior cartridge housing and a single reel containing a magnetic tape positioned within the housing. The cartridge housing includes an upper housing section and a lower housing section that substantially enclose the magnetic tape. The tape includes a cartridge leader. The cartridge leader becomes exposed through an opening in the cartridge housing during insertion of the cartridge into the tape drive. The tape drive is then able to engage and retrieve the tape from the cartridge for recording and/or playback.

The ability to reliably record and play back data depends upon a constant tape tension to keep the tape in contact with the head and to avoid stretching the tape. This has the effect of moving the data bands apart or closer together thereby making it more difficult to read all of the tracks. As data densities increase the acceptable amount of variation in tension decreases because the tracks are narrower. For future tape drives, being able to monitor and correct the tension will become a necessity.

Previously, tape medium tension was determined by creating loops or bends in the tape medium using swing arms in the tape path. The displacement of the swing arm was inversely proportional to the tension of the tape medium. The additional swing arm component increases complexity. Moreover, the accuracy and sensitivity of a swing arm tension sensor is not reliable.

Therefore, a simple, inexpensive, and accurate way to measure and control tape tension in a tape drive is desired.

BRIEF SUMMARY OF THE INVENTION

In accordance with embodiments of the present invention, a tension sensor within a tape drive for measuring tension of a magnetic tape medium is provided. The tape tension sensor comprises: a guide pin connected to a top plate for guiding the magnetic tape medium, at least two flexure structures, disposed in a parallel configuration connected to the top plate and a base, and at least one magnetic field density sensor associated with the guide pin for detecting lateral motion of the guide pin. The magnetic field of a magnet connected under the guide pin is detected by the at least one magnetic field sensor to detect the lateral motion of the guide pin. The lateral motion of the guide pin caused by the tape medium may be used to determine the tension of the tape medium. In some embodiments, the guide pin is a tape guiding roller.

In accordance with other embodiments of the present invention, a method of operating a tape drive system with a tape tension sensor is provided. The method comprises: passing a tape medium between a take-up reel and a supply reel such that a tension in the tape medium causes the tape medium to apply pressure onto a head element; using a tension sensor in the tape path to detect the tension in the magnetic tape medium. Using a tension sensor comprising a guide pin connected to a top plate for guiding the magnetic tape medium, at least two flexure structures, disposed in a parallel configuration connected to the top plate and a base, and at least one magnetic field density sensor associated with the guide pin for detecting lateral motion of the guide pin. The magnetic field of a magnet connected under the guide pin is detected by the at least one magnetic field sensor to detect the lateral motion of the guide pin. The lateral motion of the guide pin caused by the tape medium may be used to determine the tension of the tape medium. In some embodiments, a plurality of tape tension sensors are provided in a tape drive.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

The present invention and its various embodiments are better understood upon consideration of the detailed description below in conjunction with the accompanying drawings and claims.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

Figure 1:
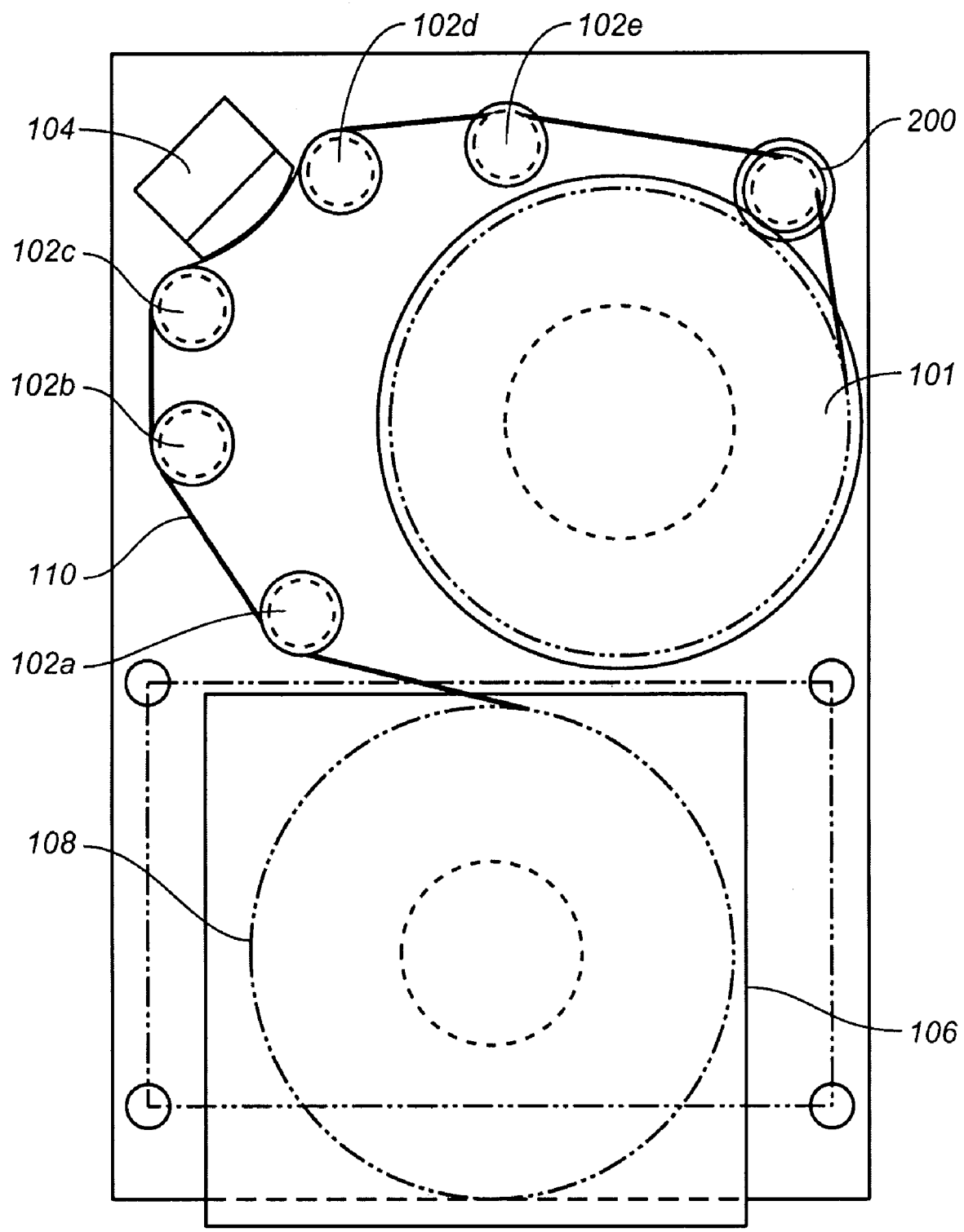
FIG. 1 illustrates an embodiment of a tape drive system including a tape tension sensor.

FIG. 1 shows a simplified view of an exemplary tape drive 100 having a removable tape cartridge 106 loaded therein. The tape cartridge 106 typically comprises a cartridge housing enclosing a tape medium 110 wound about a rotatable supply reel 108. The tape drive 100 typically includes a take-up reel 101, a plurality of rollers 102a, 102b, 102c, 102d, 102e, and a read/write head 104. The take-up reel 101 includes a take-up leader that is coupled to a supply leader extending from one end of the tape medium 110, when the tape cartridge 106 is loaded into the tape drive 100. The tape medium 110 typically comprises a thin film of magnetic material which stores the data. To read or write data, the tape medium 110 is spooled between the take-up reel 101 and the supply reel 108, with rollers 102 guiding the tape medium 110 across the read/write head 104. Upon insertion of the tape cartridge 106 into the tape drive 100, the tape medium 110 on the cartridge reel 108 is coupled to the take-up reel 110 of the tape drive 100. Subsequently, prior to removing the tape cartridge 106 from the tape drive 100, the tape medium 110 is rewound onto the cartridge reel 108 and the supply leader is then uncoupled from the take-up leader.

When performing read/write operations on the tape medium 110, it is important to maintain a proper tension in the tape medium 110, in order to maintain effective contact between the read/write head 104 without causing excessive stress on the tape medium 110. As the thicknesses of tape media and the width of data tracks on tape media continue to decrease with new technological improvements, the importance of tension control increases. Tension variation within the tape path may produce spikes in the lateral tape motion (LTM) and can cause unacceptable levels of stress in the edges of the tape medium 110.

The tension of the tape may be measured by including a tape tension sensor 200 in the guided tape path created by the plurality of rollers 102a, 102b, 102c, 102d, 102e, between the take-up reel 101 and a read/write head 104. The tape drive may include, but is not limited to, two to six rollers. The tape tension sensor 200 may have a position within the tape path in which the tape media 110 has the greatest tape wrap. Therefore, the force applied by the tape media 110 on the tape tension sensor 200 may be greater than the force applied by the tape media 110 on the plurality of rollers 102a, 102b, 102c, 102d, and 102e.

Figure 2:
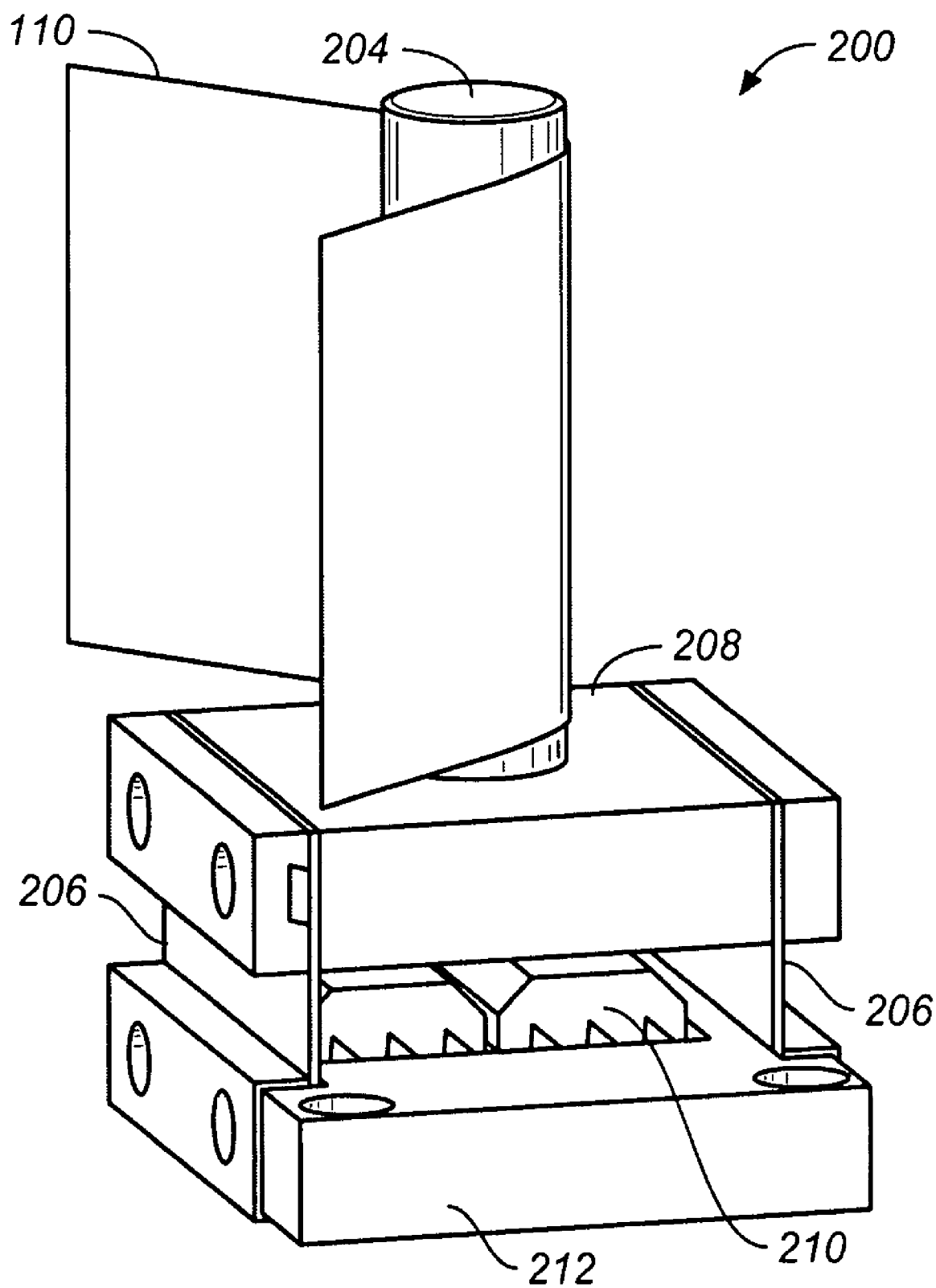
FIG. 2 illustrates an embodiment of a tape tension sensor.

FIG. 2 shows a tape tension sensor 200 in accordance to embodiments of the present invention. As illustrated in FIG. 1, tape tension sensor 200 is integrated into the tape path of the tape drive. The tape tension sensor 200 may guide the tape media 110 similarly to the plurality of rollers 102a, 102b, 102c, 102d, and 102e. The guide pin 204 guides the tape media 110 as it travels through the tape drive. The guide pin 204 is connected to a top plate 208. According to other embodiments of the invention, the guide pin 204 may be a tape guiding roller. In other embodiments, a plurality of tape tension sensors is provided in the tape drive.

At least two flexure structures 206 in a parallel configuration are connected to the top plate 208 and a base 212. The flexure structures 206 act as a four-bar suspension, which keeps the guide pin 204 and top plate 208 parallel to the base 212. The assembly of the flexure structures 206, top plate 208, and base 212 may also keep the guide pin 204 perpendicular relative to the base. The flexure structures 206 are designed to be stiff to keep the guide pin 204 and top plate 208 motion to be small over an expected tension range and keep the resonant frequencies high for more accurate measurements. The guide pin 204 may be deflected, for example, 0.03 inches in either lateral direction. The flexure structures 206 may be made of steel, for example. The parallel configuration of the flexure structures 206 helps prevent motion in other directions.

A magnetic field sensor 210 is mounted beneath the guide pin 204 and top plate 208 assembly to detect lateral motion of the guide pin 204 using a magnet 302 (shown in FIG. 3) mounted to the underside of the top plate 208. In particular, according to certain embodiments of the present invention, the magnetic field sensor 210 is a Hall sensor. Moreover, duel magnetic field sensors may be used to increase sensitivity by differential operation.

Figure 3:
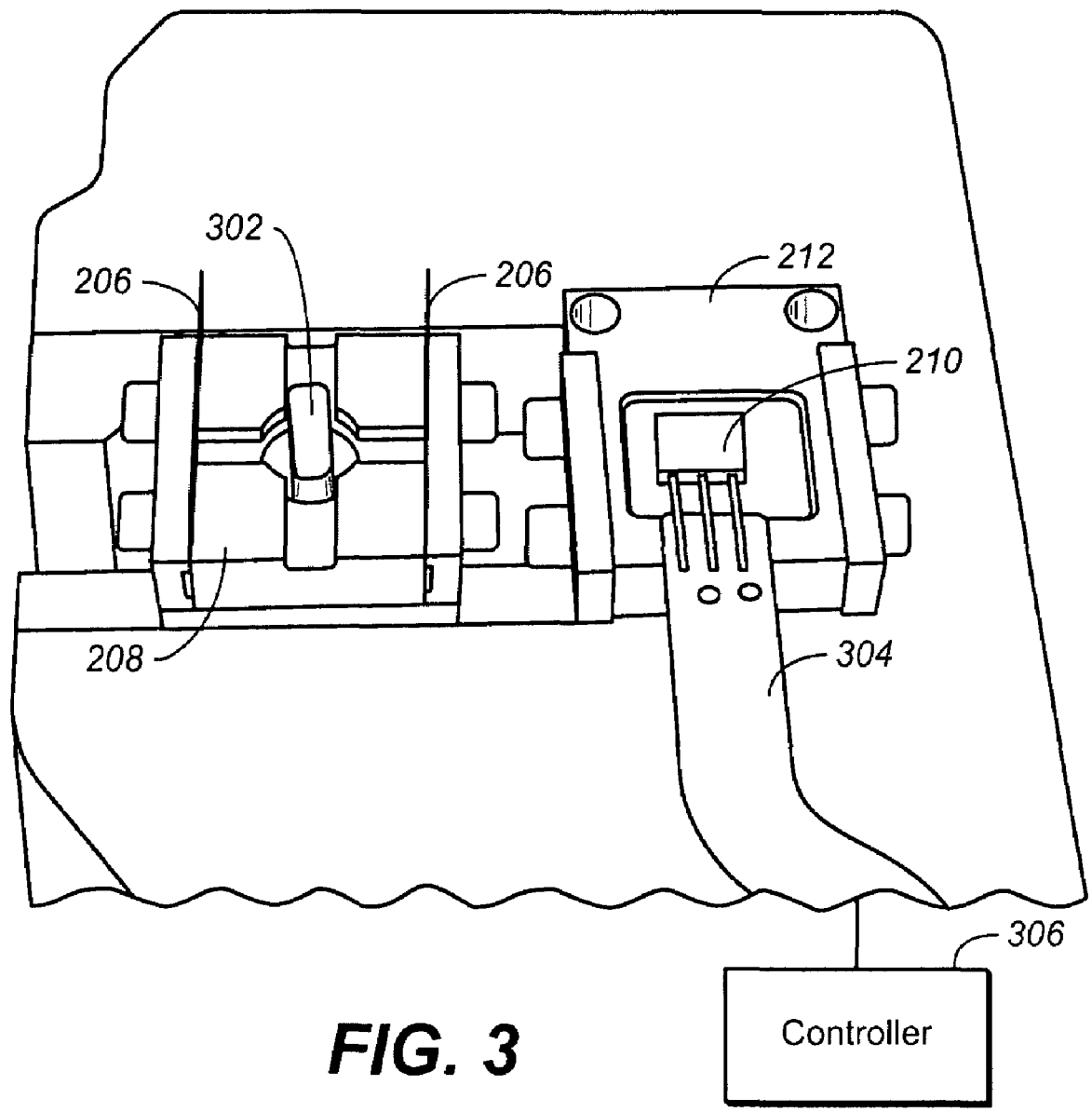
FIG. 3 illustrates an embodiment of an opened-up perspective view of the tape tension sensor.

In FIG. 3, a opened-up perspective view of the tension sensor 200 is shown. The underside of top plate 208 is shown with two flexure structures 206 connected on opposite sides of the top plate 208. The magnet 302, discussed above, used for detecting lateral motion of the guide pin 204 due to the tension of the tape media 110, is connected under the guide pin 204. Movement of the magnet 302 is detected by magnetic field sensor 210, which is connected to the base 212. As the guide pin 204 is deflected by the tape medium as it is guided through a tape path to contact the read/write head 104 (FIG. 1), the magnetic field of magnet 302 changes and is detected by the magnetic field sensor 210. The voltage output data of the magnetic field sensor 210 may be related to the tension of the tape media 110 associated with the guide pin 204. In some embodiments, the output voltage data from the magnetic field sensor 210 may be fed into the tape speed/tension servo and used to monitor and control tape tension in the tape drive via a connection 304. The connection 304 may connect the tension sensor to a controller 306. The controller 306 may comprise logic to monitor and control tape tension in the tape drive. Controller 306 may be a computer system and store the tension output from tension sensor 200.

Figure 4A:
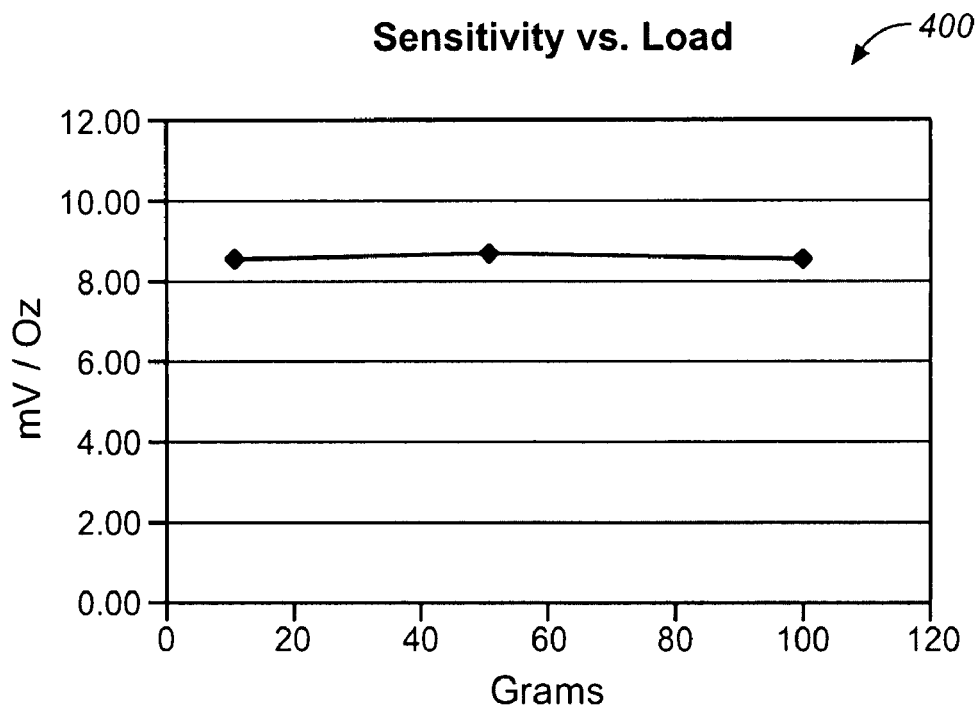
FIG. 4A illustrates an embodiment of an output of sensitivity versus load of the tape tension sensor.

FIG. 4A illustrates embodiments of the output of the tape tension sensor 200. The graph 400 illustrates that the sensitivity (volts of output for each gram of load) does not change as the load is increased or decreased. More particularly, graph 400 illustrates that deflection of the guide pin 204 varies linearly with tension. The sensitivity and ease of determining a tape tension may be useful in providing feedback to the tape speed/tension servo to maintain effective contact with the read/write head 104.

Figure 4B:
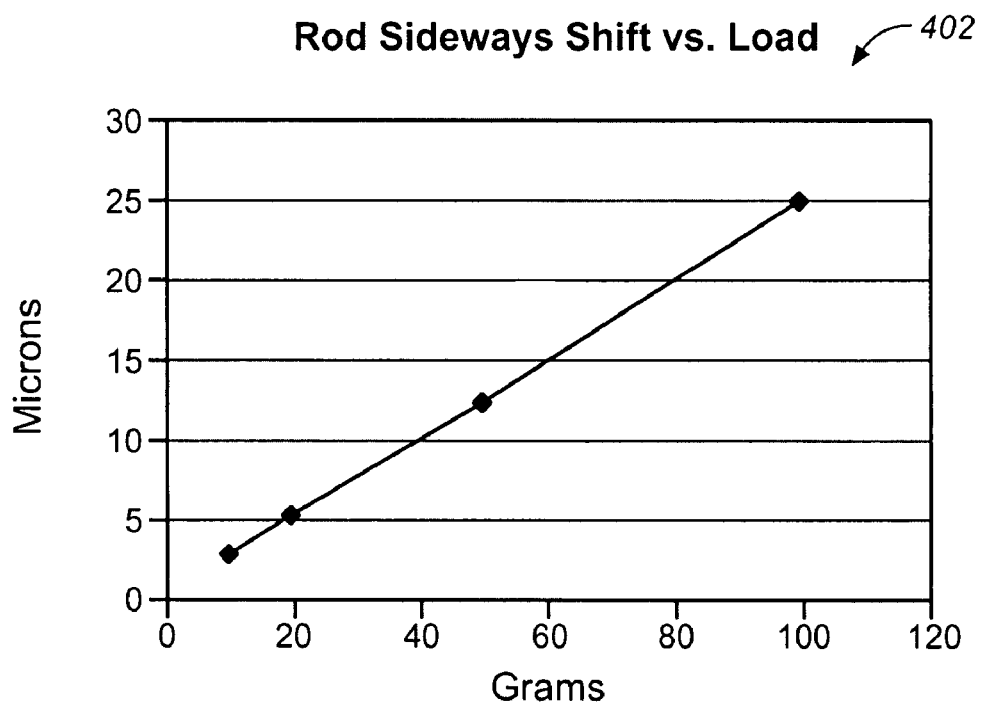
FIG. 4B illustrates an embodiment of an output of sideways shift versus load of the tape tension sensor.

FIG. 4B illustrates other embodiments of the output data of the tape tension sensor 200 as deflection distance of the guide pin 204 versus load. The graph 402 shows that as the load is increased, the guide pin 204 is deflected a small distance. This demonstrates that the four-bar suspension of the at least two flexure structures 206 in a parallel configuration effectively maintains the stability and parallel configuration of the top plate 208 and guide pin 204 assembly with the base 212. This demonstrates the accuracy and sensitivity of the tape tension measurement according to embodiments of the invention.

It will be appreciated that embodiments of the invention may overcome problems encountered with previous tape drive designs. The ability to reliably record and play back data depends upon a constant tape tension to keep the tape in contact with the head and to avoid stretching the tape which has the effect of moving the data bands apart or closer together thereby making it more difficult to read all of the tracks. As data densities increase the acceptable amount of variation in the tape tension decreases because the tracks are narrower.

According to embodiments of the invention, a tape tension sensor will be able to monitor and correct tension of the tape media. The tape tension sensor output may allow accurate tension adjustment for increasing or decreasing the force of tape media on the head element to improve the data signal generated by the head element. Thus, the tape tension sensor output can provide feedback information for an error recovery technique. A controller may implement the tension feedback system using the tape tension sensor.

The foregoing description of the preferred embodiments of the invention has been presented for the purposes of illustration and description. It is not intended to be exhaustive or to limit the invention to the precise form disclosed. Many modifications and variations are possible in light of the above teaching. For example, in some of the above-described embodiments, two tension sensing elements are provided for monitoring the force applied by each head element. In other embodiments, fewer or greater numbers of tension sensing elements may be provided for each head element, depending on the desired resolution of force monitoring.

In addition, it is understood that in some embodiments of the invention, there may be more than one tension sensor provided in the tape drive. For example, it may be desired to have one or more tension sensors dedicated to monitoring and controlling tape tension within the tape drive. Alternatively, two different tension sensors may be provided in the tape drive and be selectively chosen for sensing tape tension, depending on the type of tape cartridge loaded into the drive.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
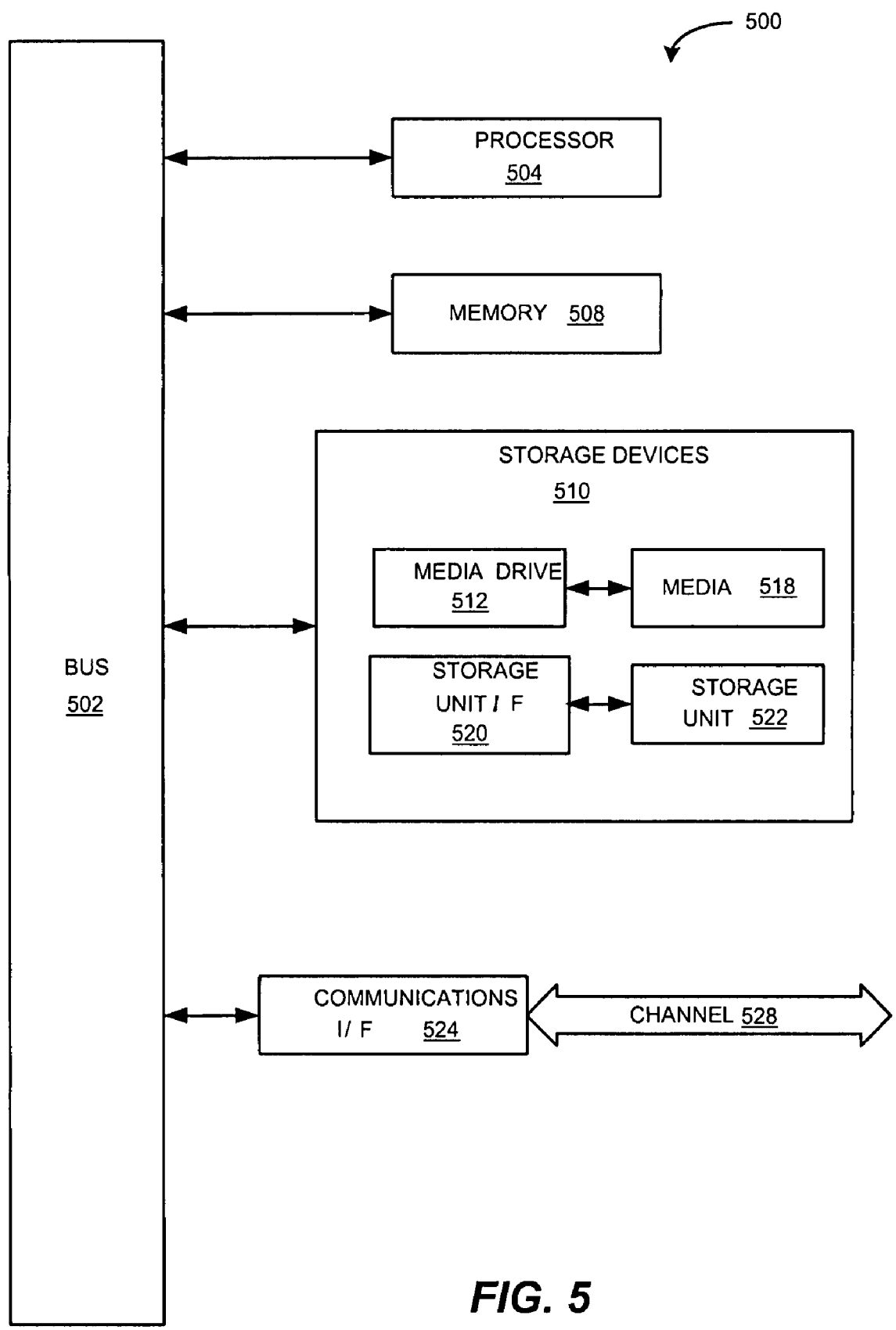
FIG. 5 is a block diagram of a embodiment of a computer system.

FIG. 5 illustrates an exemplary computing system 500 that may be employed to implement processing functionality for various aspects of the invention (e.g., as a controller). Those skilled in the relevant art will also recognize how to implement the invention using other computer systems or architectures. Computing system 500 may represent, for example, a desktop, mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, for example random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage mechanism 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage mechanism 510 may include other similar instrumentalities for allowing computer programs or other instructions or data to be loaded into computing system 500. Such instrumentalities may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 508, storage device 518, storage unit 522, or signal(s) on channel 528. These and other forms of computer-readable media may be involved in providing one or more sequences of one or more instructions to processor 1004 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

The above detailed description is provided to illustrate various examples and is not intended to be limiting. It will be apparent to those of ordinary skill in the art that numerous modification and variations within the scope of the present invention are possible. For example, various examples described herein may be combined and altered. Further, numerous other devices and processes not explicitly described herein may be used with the exemplary cartridges and locking mechanisms described as will be recognized by those of ordinary skill in the art. Additionally, within the description, particular examples have been discussed and how these examples are thought to address certain disadvantages in related art. This discussion is not meant, however, to restrict the various examples to methods and/or systems that actually address or solve the disadvantages. Accordingly, the present invention is defined by the claims and should not be limited by the description herein.

What is claimed is:

1. A tension sensor within a tape drive for measuring tension of a magnetic tape medium, the tension sensor comprising:
    a guide pin connected to a top plate for guiding the magnetic tape medium;
    at least two flexure structures connected to the top plate and a base such that the at least two flexure structures are in a parallel configuration; and
    at least one magnetic field density sensor associated with the guide pin for detecting lateral motion of the guide pin.

2. The tension sensor of claim 1, wherein the magnetic field density sensor is a Hall sensor.

3. The tension sensor of claim 1, wherein the guide pin is a tape guiding roller.

4. The tension sensor of claim 1, wherein an output of the tension sensor represents a voltage associated with a load.

5. The tension sensor of claim 1, wherein an output of the tension sensor represents a lateral distance associated with a load.

6. The tension sensor of claim 1, wherein the at least two flexure structures allow motion in one substantially lateral direction.

7. A tape drive system for measuring tension of a magnetic tape medium comprising the tension sensor of claim 1, and a head element for accessing data on the magnetic tape medium.

8. A method of operating a tape drive system including a tension sensor in a tape path to detect a tension in a magnetic tape medium, the method comprising:
    passing the magnetic tape medium between a take-up reel and a supply reel along the tape path such that a tension in the magnetic tape medium causes the magnetic tape medium to contact a head element;
    guiding the magnetic tape medium on a guide pin connected to a top plate, wherein at least two flexure structures are connected to the top plate and a base, and disposed in a parallel configuration; and
    detecting lateral motion of the guide pin using at least one magnetic field density sensor associated with the guide pin.

9. The method of claim 8, wherein the guide pin is a tape guiding roller.

10. The method of claim 8, wherein an output of the tension sensor represents a voltage associated with a load.

11. The method of claim 8, wherein the at least two flexure structures allow motion in one substantially lateral direction.

12. The method of claim 8, wherein an output of the tension sensor represents a lateral distance associated with a load.

13. The method of claim 8, wherein an output of the tension sensor provides feedback information for adjusting the tension of the magnetic tape media.

14. A tape drive system for measuring tension of a magnetic tape medium, the tape drive comprising:
    a head element for accessing data on the magnetic tape medium; and
    a plurality of tension sensors, wherein each tension sensor comprises:
        a guide pin connected to a top plate for guiding the magnetic tape medium;
        at least two flexure structures connected to the top plate and a base such that the at least two flexure structures are in a parallel configuration; and
        at least one magnetic field density sensor associated with the guide pin for detecting lateral motion of the guide pin.

15. The tape drive system of claim 14, wherein the plurality of tension sensors comprises two tension sensors.

16. The tape drive system of claim 14, wherein the plurality of tension sensors comprises four tension sensors.

17. The tape drive system of claim 14, further comprising:
    a take-up reel; and
    a tape path for the magnetic tape medium.

18. The tape drive system of claim 14, further comprising a controller.

* * * * *